United States Patent

[11] 3,580,674

[72] Inventors Kurt Schunck;
Waldemar Baunach, Frankfurt, Germany
[21] Appl. No. 777,037
[22] Filed Nov. 19, 1968
[45] Patented May 25, 1971
[73] Assignee Klimsch & Co.,
Frankfurt Main, Postfach, Germany

[54] DEVICE FOR FAST REMOVAL OF EXPOSED FILM FROM THE SUCTION BOARD OF PROCESS CAMERAS AND DELIVERY TO A SUBSEQUENT PROCESS STATION

9 Claims, 11 Drawing Figs.

[52] U.S. Cl. .......... 355/28, 355/29, 355/72, 355/73, 355/100
[51] Int. Cl. .......... G03b 29/00
[50] Field of Search .......... 355/27, 28, 29, 72, 73; 95/13, 14, 27, 28

[56] References Cited

UNITED STATES PATENTS

| | | | |
|---|---|---|---|
| 1,466,766 | 9/1923 | Stewien .......... | 355/29 |
| 1,808,669 | 6/1931 | Liberman .......... | 355/27 |
| 1,976,318 | 10/1934 | Young et al. .......... | 355/29 |
| 2,287,271 | 6/1942 | Powers .......... | 355/29 |
| 3,068,749 | 12/1962 | Anander .......... | 355/73 |

*Primary Examiner*—Samuel S. Matthews
*Assistant Examiner*—D. J. Clement
*Attorney*—Rummler and Snow

ABSTRACT: A device for the speedy removal of exposed light sensitive material such as films, foils, or papers from an appropriate holder in the exposure plane of a process camera, the holder being incorporated in the camera back in such a way that it may be moved out of the exposure plane to a position where the exposed film can be engaged by automatic gripper means and delivered for the automatic transport to a subsequent processing station.

INVENTORS
KURT SCHUNCK
WALDEMAR BAUNACH

BY Gummler & Snow
Attys

INVENTORS
KURT SCHUNCK
WALDEMAR BAUNACH

BY Rummler & Snow
ATTYS

INVENTORS
KURT SCHUNCK
WALDEMAR BAUNACH
BY Pummler & Snow
ATTYS

INVENTORS

KURT SCHUNCK
WALDEMAR BAUNACH

BY Rummler & Snow

ATTYS

DEVICE FOR FAST REMOVAL OF EXPOSED FILM FROM THE SUCTION BOARD OF PROCESS CAMERAS AND DELIVERY TO A SUBSEQUENT PROCESS STATION

BACKGROUND OF THE INVENTION

It is common practice to equip process cameras with holders or plates, preferably suction boards, on which the light sensitive material is kept plane, these suction boards being incorporated in the camera back in such a way that they can be swung backwards from the exposure plane for manual loading or removal of the light sensitive sheet material. In the case of rollfilm cameras, mechanical means for feeding the light sensitive material onto the suction board are also available.

Rollfilm cameras are often used in conjunction with an automatic film processor. There are even film removal devices available for transporting the film from such a camera to the processor, but with these devices the speed of removal of the exposed material from the camera was adjusted to the speed of the processor. A maximum linear speed of the film through a processor, such as those actually in use, is 24 to 30 inches per minute, which means that for a period of up to one minute the camera had to stand idle.

For this reason it is the main purpose of our invention to provide a device for the rapid removal of exposed material from the camera and its automatic transport to the subsequent processing station, preferably an automatic film processor. It is particularly important that the exposed film be taken off the suction board in a minimum of time so that the board may be reloaded and in the exposure plane within a few seconds. Moreover, it is necessary to match the time for the transport of exposed film, and/or the interval between successive film transfers to the feeding table of the processor, with the processing speed of the machine. In addition, the film must be delivered to the feeding end of the processor in proper alignment regardless of the size. Finally, the transport system must make it possible to place the camera and the processor in the most suitable position relative to each other, taking into account individual requirements and local conditions, such as the size of the dark room in which the camera back and the transfer equipment are located. The removal device must also insure an easy access to the camera back.

SUMMARY OF THE INVENTION

According to the invention the requirements outlined heretofore are met by an arrangement which provides for a holder plate mounted in the camera back so that it may be swung backwards from the exposure plane and which comprises suitable grippers swingably mounted in the camera back so that when the plate holder is swung backwards its rearwardmost edge comes within the operational range of the grippers. The drive means for operating the holder plate, the vacuum for keeping the light sensitive material on the holder plate, and the operating means for the grippers are coupled in such a way that the backward motion of the holder plate, the seizing of the exposed film by the grippers, the release of the vacuum, the removal of the film from the holder plate and its transfer to the adjacent transport system, follow each other in the order stated. Consequently the camera is equipped with a gripper system whose operation is synchronized with a backward motion or swinging of the holder plate and a sudden and complete release of the light sensitive material from the holder plate, simultaneously with or immediately after the grippers have seized the sensitive material. The grippers pick up one end of the material, and in the case of a rollfilm camera it is the edge which protrudes from the holder plate. Upon rearward tilting or swinging of the holder plate this edge comes within the operational range of the grippers so that they can pick up the exposed material immediately. As a rule, the holder plate is a suction board, whereby the release of the sensitive material is effected by opening a valve on the suction board or in the vacuum hose.

The exposed sensitive material is taken off the holder plate immediately after the grippers have picked it up, and to effect this the vacuum of the suction board must be shut off suddenly and completely. According to our invention the vacuum control, by means of valves or flaps, is mechanically coupled with the backward motion of the suction board, but other means may also be provided, such as a valve coupled with the drive means for the grippers or a magnetic valve that opens when the grippers start operating.

The travel of the exposed material picked up by the grippers must be accelerated so that the material can be taken off the suction board in the shortest possible time, in order that the holder plate will be free for immediate reloading. On the other hand, the speed of the film should not be too high when it arrives at the subsequent processing station. Our invention proposes to use for this purpose a crank gear, driving directly or by use of a rack or other transmission means, a swingable outrigger arm to which the gripper bar is secured. If tiltable gripper bars are not wanted, another advantageous solution is a multiple outrigger and/or end-conveyor system. In this case, the gripper bar, secured to pusher guides, moves only a short distance to start the removal of the exposed light sensitive material. After the necessary acceleration of the exposed material the gripper bar transfers the material to a preferably tiltable double belt conveyor for its transport to the subsequent processing station. This special execution of the invention disclosed herein will generally be limited to those cases where the subsequent processing station or the feeding table of the processor is located behind the camera in line with the camera axis.

Particular advantages are offered by an embodiment of the invention in which the removal from the suction board and transport of the exposed film consists of the following operational steps: pick up the exposed film by grippers, acceleration of film sheet travel to match the speed of a preconveyor, preferably a belt conveyor with endless upper and lower belts, transfer of the film to a belt and roller grate correct alignment by means of pusher-guides, lowering of an upper belt or roller grate onto the sheet in idle position, activating a drive means for the grate and transport of the sheet by a single or multiple end-conveyor in the form of a belt-conveyor which may be adjusted to the height of the feeding table of a film processor or some other processing station. It has proved an advantage to make the speed of the end-conveyor adjustable by hand or by synchronizing elements known in the art in order to match the speed of the film processor. In conjunction with this special embodiment of the invention it is suggested that the grate, consisting of upper and lower parts, be tiltable so that the access to the camera is assured at all times.

When the grate is tilted the end-conveyor is additionally provided with a slot or flap for manually feeding film into the system for its transport to the film processor.

DESCRIPTION OF THE DRAWINGS

A specific embodiment of our invention is shown in the accompanying drawings in which:

in FIG. 8; and

DESCRIPTION OF THE PREFERRED EMBODIMENTS

Figures 1, 3:
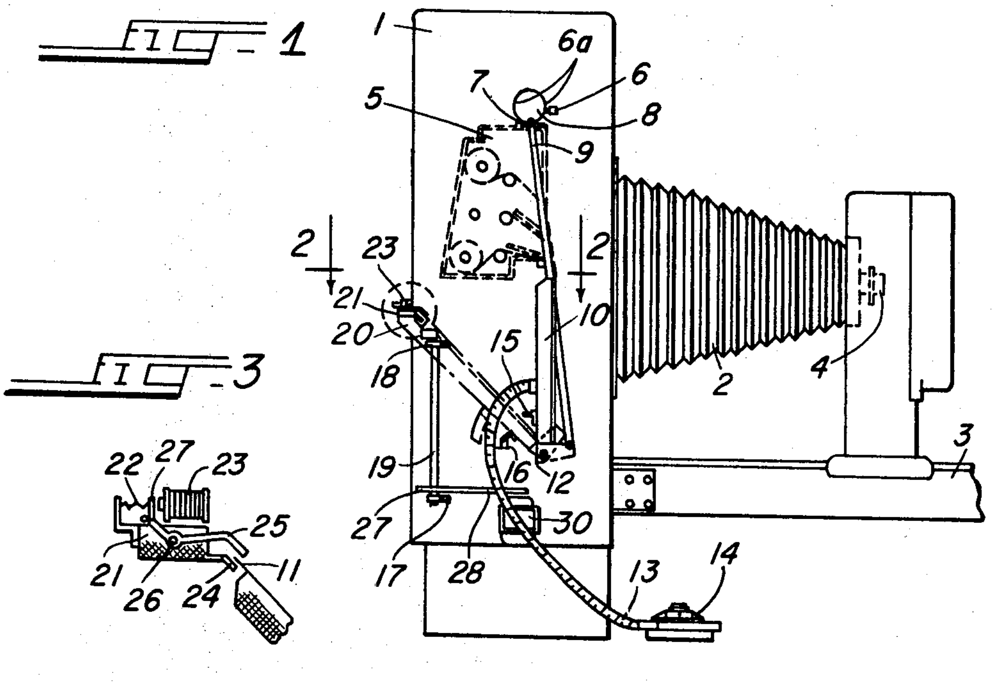
FIG. 1 is a side view of a processing camera equipped with a suction board to be swung backwards from the focal or exposure plane, and including a device for removing the exposed material from the board and conveying it immediately to the feeding table of a processor.
FIG. 3 is a detailed view showing a mechanical gripper with magnetic actuating means.

FIG. 1 illustrates a camera back 1 of a rollfilm camera, as disclosed in Pat. No. DBP 1,163,658 of the Federal Republic of Germany, which camera also comprises a bellows 2, camera bed 3, lens 4 incorporated in an axially shiftable lens holder and a dispenser 5 having a rollfilm magazine vertically displaceable for centering with the image formed by the lens 4. As shown a switching means 6 is also provided for starting the programming of exposed film removal and transport when the suction board is swung to the rear from the vertical exposure plane, this backward motion of the suction board being effected by a motor 7 driving a crank 8 and connecting rod 9. The film 11 (FIG. 2) is maintained against the suction board 10 by the action of a vacuum, and a valve means 12 is provided to shut off the vacuum which is conducted from the vacuum unit 14 to the suction board 10 be means of a hose 13. A fast stop member 16, in conjunction with a lever 15, opens the valve 12 automatically as soon as the suction board is tilted or swung to the end position of its outward movement from the exposure plane. Also, as seen in FIG. 1, bearings 17 and 18 support and journal a rotatable shaft 19 which, by means of an outrigger arm 20, carries the gripper bar 21.

Figure 2:
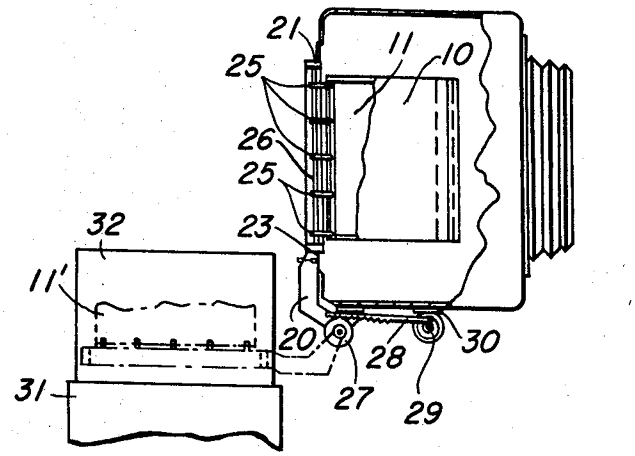
FIG. 2 is a plane view of the same as seen from the line 2–2 of FIG. 1, and showing in part an associated film processor, the suction board being shown in backward tilted position.

FIG. 3 shows an enlarged view of the gripper bar 21, which comprises laterally spaced stationary lower grippers 24 and corresponding upper grippers 25, the latter being rotatable about the axis of a shaft 26. Upper grippers normally remain open through tension of a spring 22 until the electromagnet 23, energized by the switch means 6, attracts the arm 27 extending from the gripper 25 and causes the gripper 25 to close against the fixed gripper 24. When the grippers are closed, the motor 30 is energized, for instance, by a time-relay (not shown) the said motor 30 turning to rotate the vertical shaft 19 through 90 by means of a crank 29, rack 28, and pinion 27. FIG. 2 shows that the gripper bar 21, carried on the arm 20, is moved angularly in the direction of the arrow, to the position shown in dot-dash outline by operation of the motor 30. This position is slightly above the feeding table 32 of the partially shown film processor 31.

Figure 4:
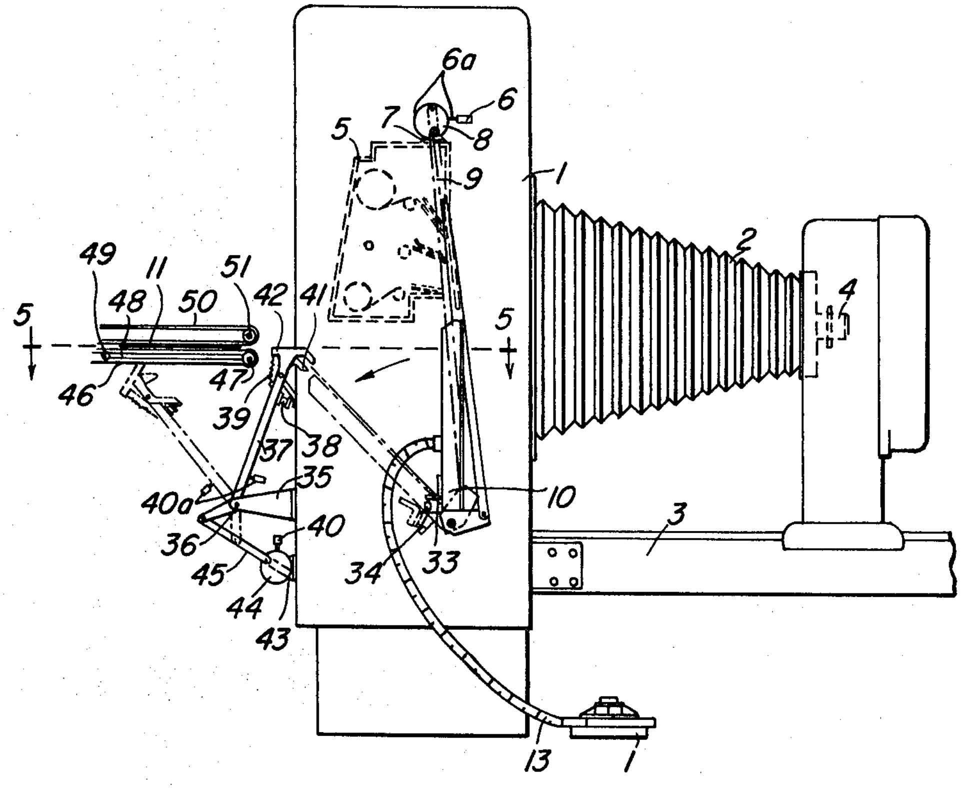
FIG. 4 illustrates a camera according to our invention having a modified film removal and conveyor system.

FIG. 4 shows another embodiment of the invention in which means for the removal of the film or sensitive material from the suction board and the transport means are separate but coacting devices. The various parts of the camera back have the same reference numbers as FIG. 1. As an alternative, however, valve 33 is opened by a solenoid 34 actuated by the switch means 6.

The system of the film pickup grippers in this form of our invention comprises bracket means 35 and rotatable shaft 36 which carries gripper bars or arms 37 to which are secured solenoids 38 for actuating the removable upper gripper members 42, said solenoids being actuated by the switch means 6 to close the grippers. The solenoids 38 are deenergized by a switch contact 40 operated by the gripper bar actuating crank 44, driven by motor 43, so that the upper gripper member 42 will open by the action of the tension spring 39 and be released from the stationary lower grippers 41 as soon as the film has been transferred to the belt pairs 46 and 50. The motor 43 swings the gripper bar 37 backwardly toward the belt pairs to the position shown by dotted outline, by means of the crank 44 and connecting rod 45. The lower conveyor belts 46 move on flying pulleys 47 (see FIG. 5) which are carried by outrigger arms 48 tiltable about the axis of shaft 49. Pulleys for the upper belts 50 are attached to a continuous shaft 51 which extends from side to side of the transport means.

Figure 5:
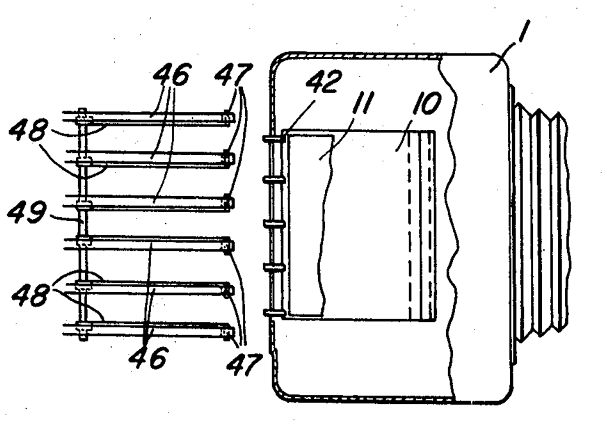
FIG. 5 is a plane view of the same taken on the line 5–5 of FIG. 4, with the suction board shown in backward tilted position.

FIG. 5 shows, in plan, the arrangement of the lower belts 46 and the outrigger carrier arms 48 supported by the shaft 49 and shiftable by rotation of the shaft 49 toward and away from the upper belts 50, as indicated in FIG. 4, to adjust the film entry space between the belt pairs. In this view, the lateral spacing of the grippers 42 is indicated but the individual gripper arms 37, which carry the grippers, and the upper belts 50 have been omitted.

Figure 6:
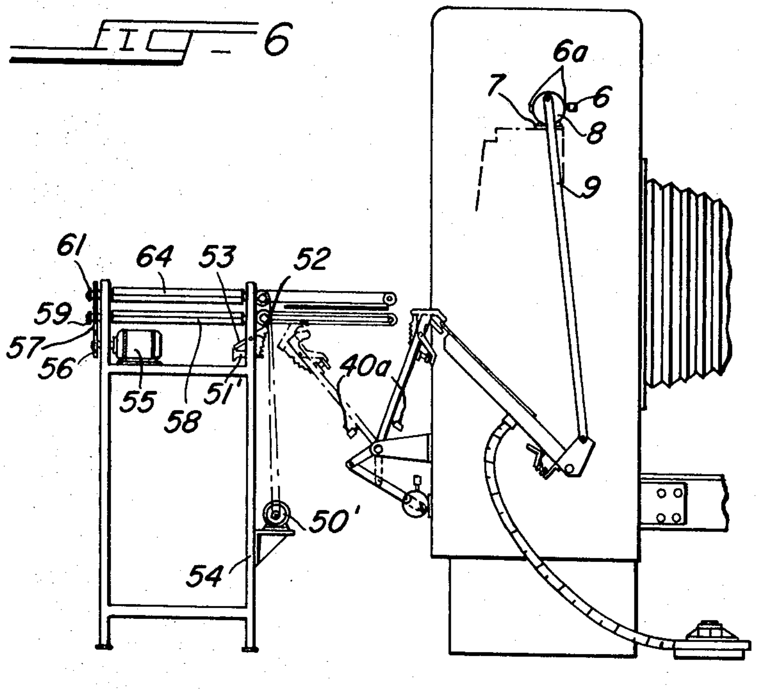
FIG. 6 is a view like FIG. 4 showing the camera with a multiple removal and conveyor systems according to the invention.

A further modification of our invention is shown in FIG. 6, in which the grippers and the contiguously arranged conveyor belts are the same as shown in FIG. 4, however with the difference that the conveyor belts nearest the camera back are shorter and are driven from motor 50′ by means of a belt or chain as soon as the removal of the film has been started by the switch means 6. For correct alignment of the sheet of film or exposed material, pusher guides 53 are actuated by solenoid 51′ while spring 52 normally holds the guides at an idle position underneath the path of sheet travel between the belt pairs.

Figure 7:
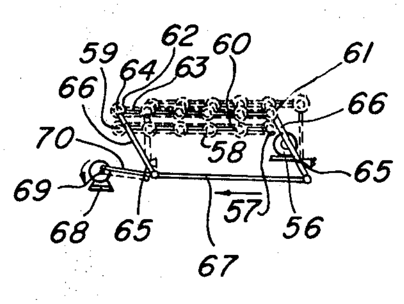
FIG. 7 is an elevational side view showing details of the roller grates of the conveyor system of FIG. 6.

The device for correct alignment of the sheet of film or other exposed material with the roller grates as well as with the belt conveyors for its transport are mounted on a base frame 54 which also supports a motor 55 driving a pinion 56. As shown in FIG. 7 and the detail view of FIG. 10, a gear 57 meshing with the pinion 56 drives the lower roller grate 58 and for this purpose each roller axle is provided with a chain wheel and sprocket 59, the motion being transmitted to all rollers simultaneously by chain 60, driven by the first roller, which in turn is driven by the gear 57. The upper roller grate comprises a series of rollers, the first of which is driven by a pinion 61 which is meshed with e gear 57, the others being driven by sprockets 62 and a chain 63.

The lifting device for the upper roller grate is shown in detail in FIG. 7 wherein 65 indicates the centers of rotation or fulcrums for parallelogram levers 66 connected by rod 67. Motor 68 sets the lifting device in motion through a crank 69 and connecting rod 70.

Figures 8, 10:
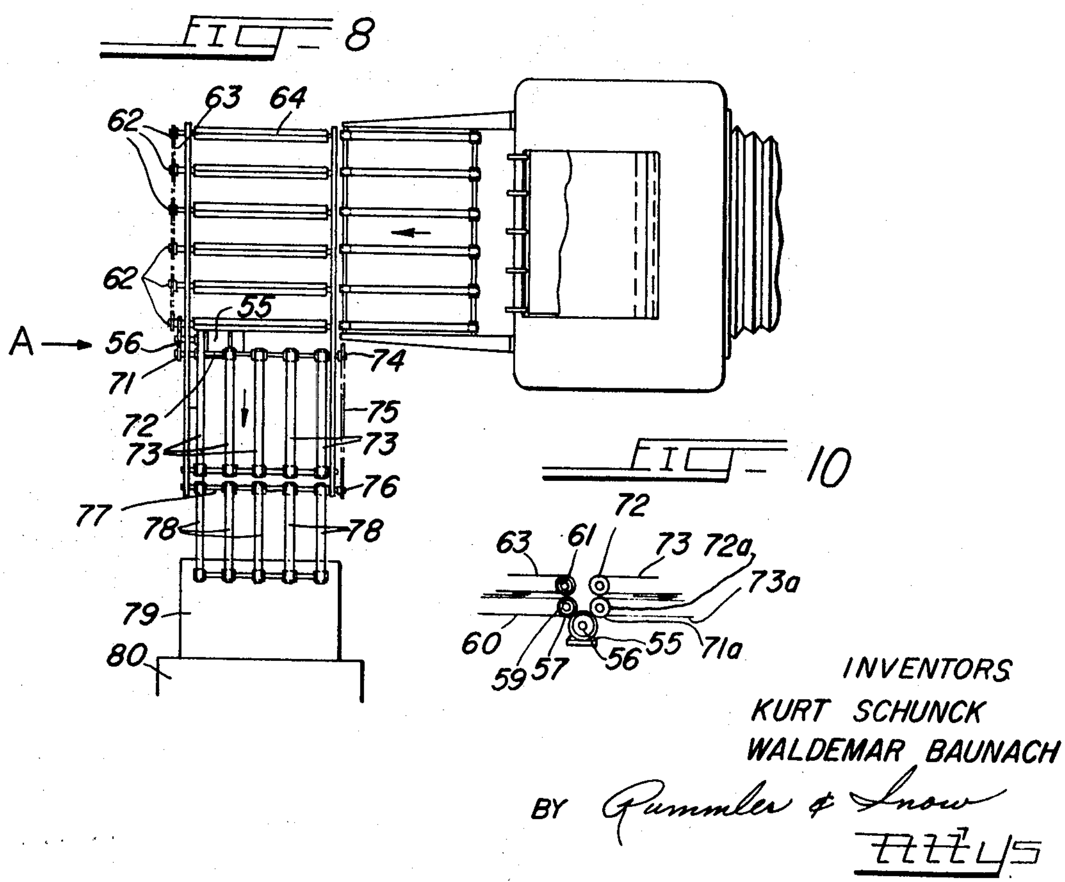
FIG. 8 is a plane view of the device shown in FIG. 6.
FIG. 10 is a detail of the conveyor drive indicated at A.

A top view of the device illustrated in FIG. 6 is shown in FIG. 8 in which the end conveyor is contiguously arranged relative to the lower grate, said end conveyor being also driven by motor 55 through pinion 56 (see FIG. 10) which through pinion 71*a* drives pinion 71 and belt driving shafts 72—72*a*, and thereby drives all belts 73 and 73*a*, as well as the chain sprocket 74 which, through chain 75 and sprocket 76 sets in motion a second series of belts comprising a drive shaft 77 and driven belts 78. This second series of belts may be swung or tilted about shaft 77 to adjust the height of the delivery end of the transport device with that of the feeding table 79 of the film processor 80.

Figure 9:
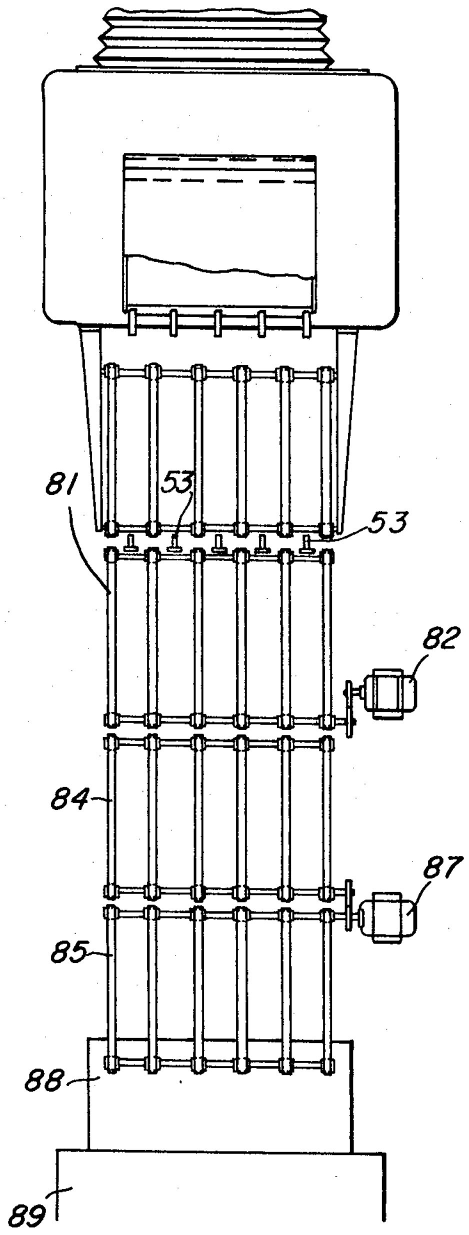
FIG. 9 is a view similar to FIG. 8 but showing the film transport means extended in the direction of the camera optical axis.
Figure 11:
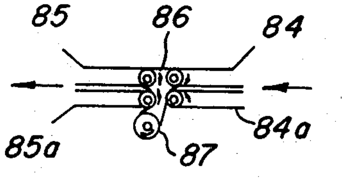
FIG. 11 is a similar view showing the drive for the end-most conveyors of FIG. 9.

FIG. 9 shows the camera equipped with a transport device similar to that shown in FIG. 6. In this case, however, the removed and preconveyed sheet of exposed material is not aligned on a roller grate but rather on a belt grate 81, which consists of pairs of upper and lower belts (similar to those shown in FIG. 11). While the sheet of film is fed into the unit the upper belt section of the belt grate 81 is slightly raised so that the guides 53 can align the sheet in the same way as on the roller grate shown in FIG. 6. As shown in FIG. 9, however, further transport is effected in the same direction in which the film was removed from the suction board, i.e., axially of the camera, and for this purpose a roller grate cannot be used as a possible curling of the film would impede its correct transport. With this arrangement, after proper alignment of the film or sheet by pushers 53, the upper section of the belt grate 81 is lowered, the motor 82 is started, and the further transport of the aligned sheet of film is effected by the pairs of conveyor belts 84—84*a* and 85—85*a*, which are set in motion by a common drive means (see FIG. 11), preferably a chain drive by chain 86 and motor 87. The discharge end of conveyor belts 85—85*a* may be tilted to adjust its height to that of the feeding table 88 of the processor 89.

The transport system herein described may also have an additional slot through which individual film sheets or the like may be fed into the transport means in the dark room for transport to the subsequent processing station.

In general, operation of the sheet removal and transport means is initiated by the photographer, upon completion of an exposure, actuating a start switch, not shown, for the motor 7. As the crank 8 is turned to drive the connecting rod 9 and swing the holder plate 10 backwardly from the exposure plane. A switch means 6 is actuated when the holder plate reaches the rearwardmost position, shown in dotted outline in FIGS. 1 and 4 and in full in FIG. 6, to cause closing and sheet grasping operation of the grippers, 24—25 in FIG. 1 and 41—42 in FIG. 4. Then, after a suitable time delay, controlled by a time-relay not shown, a motor 30, 43 is started to swing the gripper arms backwardly to remove the exposed sheet material from the holder plate vacuum board, the vacuum having been broken or released automatically by the means 15—16, or 33—34 as the holder plate reaches its rearward position.

As the gripper arms, and grippers, approach their rearward most extent of movement, the sheet material 11 removed from the holder plate is pulled between the belt pairs 46—50 (FIG. 4) and the grippers are then opened, or released, upon operation of a suitable switch means, such as the element 40 actuated by the crank 44 shown in FIGS. 4 and 6. Then when the gripper arms reach their most backward position a rear switch 40*a* is actuated to close or bring together the upper and lower belts, 50 and 46 respectively, to cause delivery of the sheet 11 to the next transport means as shown in FIGS. 8 and 9.

Meanwhile the crank 8, operating the holder plate 10, and the crank 29 (FIG. 1) or 44 (FIG. 4), operating the gripper arms, continuing to operate, have returned the holder plate and grippers to their starting positions, at which point the respective motors are automatically stopped and the sheet removal system is again ready for operation to remove the exposed material. As indicated in FIGS. 4 and 6 a forward switch means 40*a* is provided for actuation by gripper arms when in their forward position to cause opening of the opposing belts 46 and 50, by means not shown, to ready them for reception of another sheet delivered by the gripper means.

We claim:

1. A means for fast removal of exposed light-sensitive sheet material from the holder plate of a process camera and for transport of such material to a subsequent processing station, characterized by the holder plate 10 for said sheet material 11 being mounted in the camera back 1 for backward and forward swinging movement relative to the exposure plane and about a fixed axis, drive means 7—8—9 for swinging said holder plate, movable grippers 24, 25; 41, 42 having a back and forth operational range including a rearward edge of the holder plate when it is in a backward position, means 23; 38 for operating the grippers to grasp the sheet material on the holder plate when the plate is at its backward position, and means 20, 37 for moving said grippers rearwardly after sheet grasping operation thereof to remove said sheet from the holder plate.

2. A means according to claim 1 wherein the holder plate 10 comprises a suction board, and wherein means is provided for pulling a vacuum on the suction board, means is provided for releasing the vacuum, and means is provided for operating the last named means when the plate holder is at said backward position.

3. A means according to claim 2 wherein the means for releasing the vacuum is operated by the plate holder when it reaches the said backward position.

4. A means according to claim 1 or 2 wherein a sheet transport mechanism is disposed within the range of rearward movement of the grippers for receiving the sheet material therefrom, and means are provided for operating the grippers to release said sheet material as it is received by the transport mechanism.

5. A means according to either of claims 1 or 4 wherein the means for moving the grippers rearwardly comprises a pivotally mounted arm on which the grippers are carried and which is swingable about an axis extending parallel with the plane of the camera back.

6. A means according to any of claims 1, 4 or 5 wherein the grippers are carried by swingable arms mounted on a rotatable shaft extending between brackets projecting from the camera back, and motor means is provided for swinging said arms rearwardly from the rearward position of the plate holder.

7. A means as defined by claim 4 wherein the sheet transport mechanism includes parallel pairs of upper and lower belts arranged to receive the sheet material between them, and a grate means comprising parallel upper and lower rows of rollers is disposed to receive the sheet material from the said belts for further transport toward subsequent processing means.

8. A means as defined by claim 4 wherein the sheet transport mechanism comprises a plurality of parallel pairs of upper and lower belts arranged to receive the sheet material between them, the upper belts being one part and the lower belts being another part of the transport mechanism, and wherein one of said parts is movable away from the other when the sheet is entered between them by the grippers and movable toward the other when the sheet is released from the grippers.

9. A means according to claim 2 wherein a sheet transport mechanism is disposed within the range of the rearward movement of said grippers for receiving the sheet material therefrom, means are provided for operating the grippers to release the sheet material as it is received by the transport mechanism, and control means are provided for sequentially swinging the holder plate backwards, operating the grippers to grasp the sheet material, releasing the vacuum, moving the grippers rearwardly, and then releasing the grippers from the sheet material, in the order stated.